(12) United States Patent
Baer

(10) Patent No.: US 10,507,977 B2
(45) Date of Patent: Dec. 17, 2019

(54) LOCKING ROLLER ASSEMBLIES FOR ROLLER CONVEYORS

(71) Applicant: FAST GLOBAL SOLUTIONS, INC., Glenwood, MN (US)

(72) Inventor: Jacob Baer, Alexandria, MN (US)

(73) Assignee: FAST Global Solutions, Inc., Glenwood, MN (US)

( * ) Notice: Subject to any disclaimer, the term of this patent is extended or adjusted under 35 U.S.C. 154(b) by 0 days.

(21) Appl. No.: 16/061,976

(22) PCT Filed: Dec. 29, 2017

(86) PCT No.: PCT/US2017/069009
§ 371 (c)(1),
(2) Date: Jun. 13, 2018

(87) PCT Pub. No.: WO2018/203933
PCT Pub. Date: Nov. 8, 2018

(65) Prior Publication Data
US 2019/0185269 A1      Jun. 20, 2019

Related U.S. Application Data

(60) Provisional application No. 62/500,042, filed on May 2, 2017, provisional application No. 62/593,797, filed on Dec. 1, 2017.

(51) Int. Cl.
*B65G 13/075*      (2006.01)
*B65G 13/02*       (2006.01)
*B65G 39/02*       (2006.01)

(52) U.S. Cl.
CPC ........... *B65G 13/075* (2013.01); *B65G 13/02* (2013.01); *B65G 39/02* (2013.01); *B65G 2205/06* (2013.01)

(58) Field of Classification Search
CPC ...... B65G 13/02; B65G 13/075; B65G 39/02; B65G 2205/06
(Continued)

(56) References Cited

U.S. PATENT DOCUMENTS 3,480,126 A * 11/1969 Jung ...................... B65G 51/03
                                                           193/35 A
4,253,558 A *  3/1981 Roeing ................ B65G 13/075
                                                           193/35 A
(Continued)

FOREIGN PATENT DOCUMENTS

GB       1 207 949 A    10/1970
JP       05-068931 U     9/1993
(Continued)

*Primary Examiner* — James R Bidwell
(74) *Attorney, Agent, or Firm* — Christensen, Fonder, Dardi & Herbert PLLC

(57) ABSTRACT

Locking roller assemblies for locking and unlocking a roller of a roller conveyor. The disclosed locking roller assemblies include rollers that, by default, are locked from rotation in the absence of a transferred object such as a container, crate, or pallet. When an object is present over the roller, the roller is passively actuated by the object to unlock and release the roller, enabling the roller to rotate. When the package or article has passed by the roller, the locking roller assembly resumes the default configuration of locking the roller to prevent rotation. In some embodiments, actuation of the locking mechanism is parallel to the roller axis and accomplished by a lever and cam arrangement. In other embodiments, actuation of the locking mechanism is in a direction that is orthogonal to the roller axis and accomplished by a plunger arrangement.

19 Claims, 14 Drawing Sheets

(58) Field of Classification Search
USPC .............................. 193/35 A, 37; 198/345.3
See application file for complete search history.

(56) References Cited

U.S. PATENT DOCUMENTS

| | | | |
|---|---|---|---|
| 5,131,527 A | 7/1992 | Huber | |
| 6,131,717 A * | 10/2000 | Owen | B65G 13/075 |
| | | | 193/35 A |
| 6,220,418 B1 | 4/2001 | Moradians | |
| 6,336,542 B1 * | 1/2002 | Mintonye, II | B65G 13/075 |
| | | | 193/35 A |
| 6,527,097 B2 * | 3/2003 | Dreyer | B65G 39/02 |
| | | | 193/35 A |
| 6,766,900 B2 * | 7/2004 | Kanaris | B65G 13/075 |
| | | | 198/788 |
| 7,021,456 B2 | 4/2006 | Haan et al. | |
| 9,187,248 B2 | 11/2015 | Ribau | |
| 2002/0023825 A1 | 2/2002 | Holzner et al. | |
| 2006/0137958 A1 * | 6/2006 | Bogdanovic | B65G 13/075 |
| | | | 193/35 A |
| 2009/0101466 A1 * | 4/2009 | Karcher | B65G 13/073 |
| | | | 193/35 A |
| 2013/0334783 A1 | 12/2013 | Carruyo | |

FOREIGN PATENT DOCUMENTS

| | | |
|---|---|---|
| JP | 05-081116 U | 11/1993 |
| JP | 07-257578 A | 10/1995 |
| JP | H10-109721 A | 4/1998 |
| JP | H11-157647 A | 6/1999 |
| JP | 2000-038078 A | 2/2000 |
| JP | 2000-247412 A | 9/2000 |
| JP | 2000-255733 A | 9/2000 |
| SU | 1207907 A1 | 1/1986 |

* cited by examiner

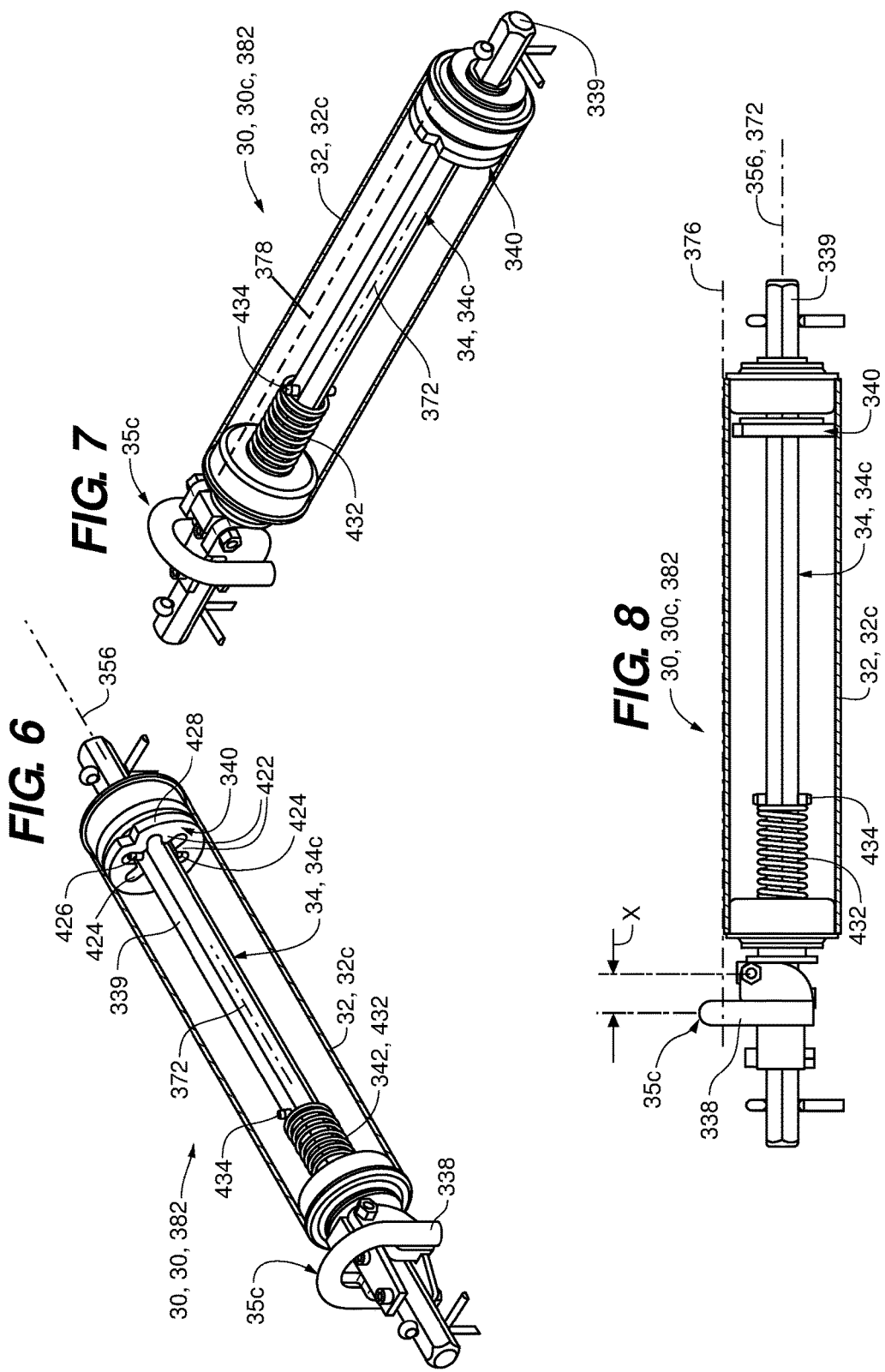

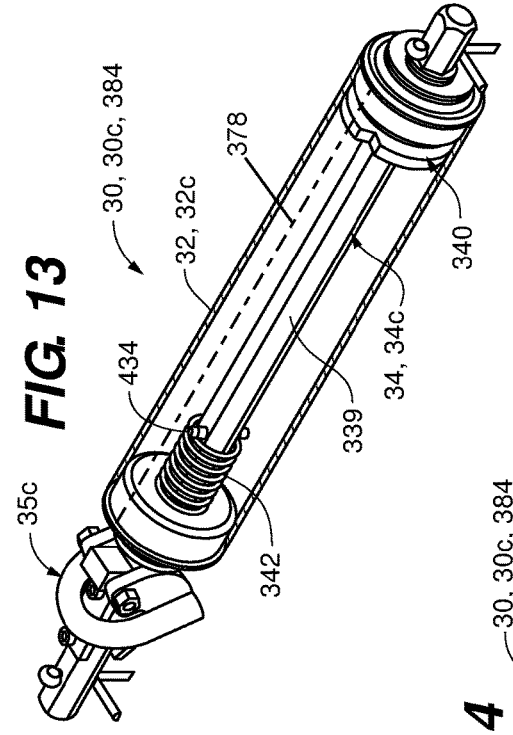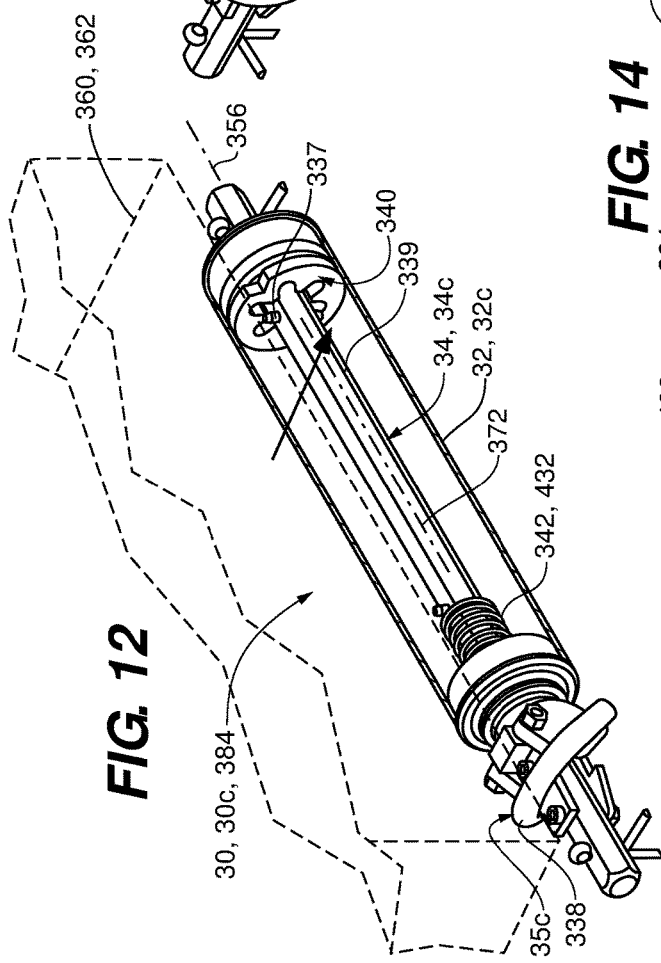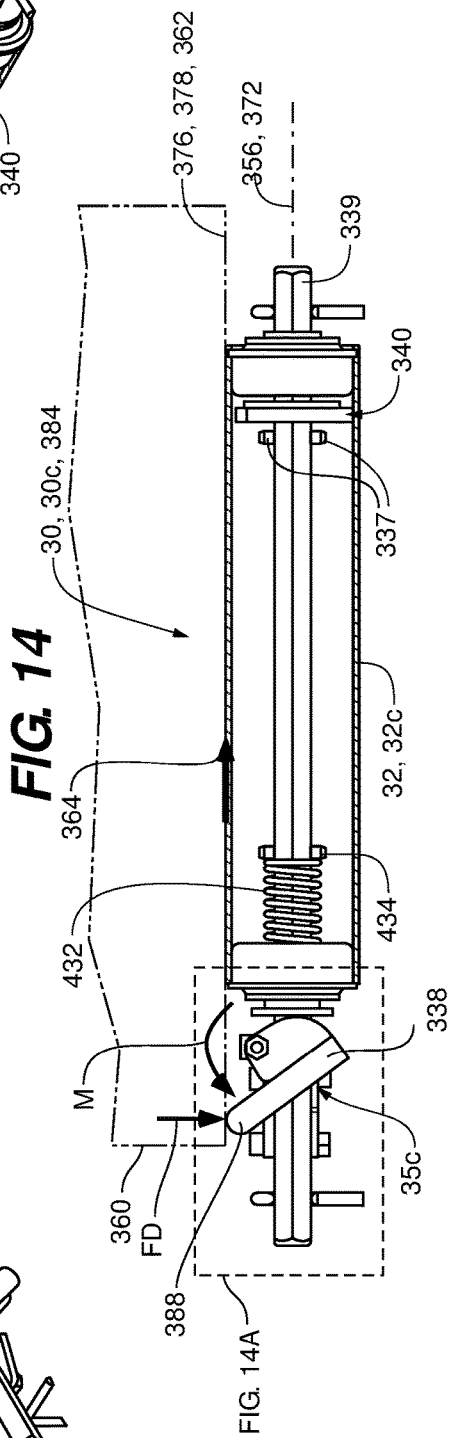

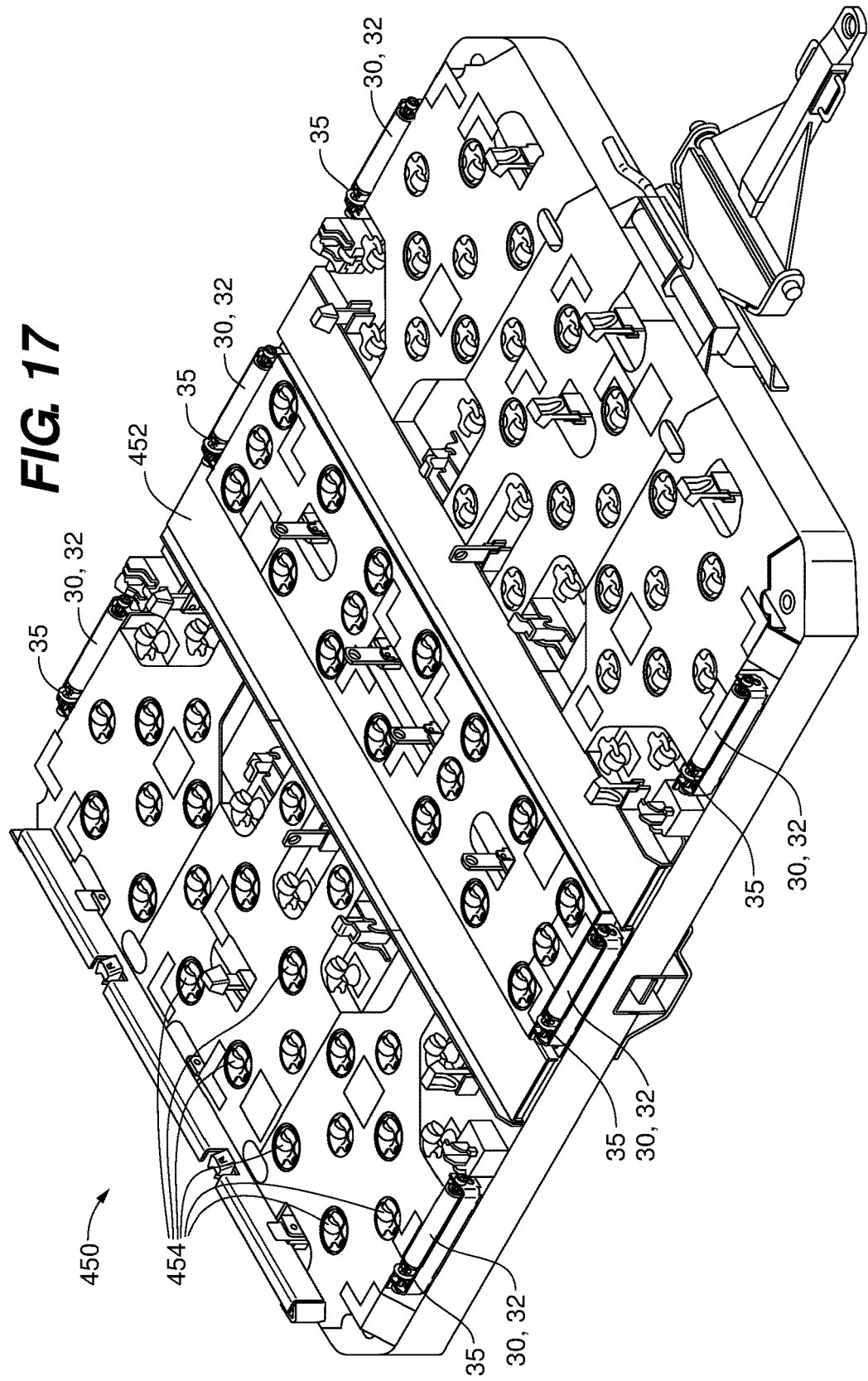

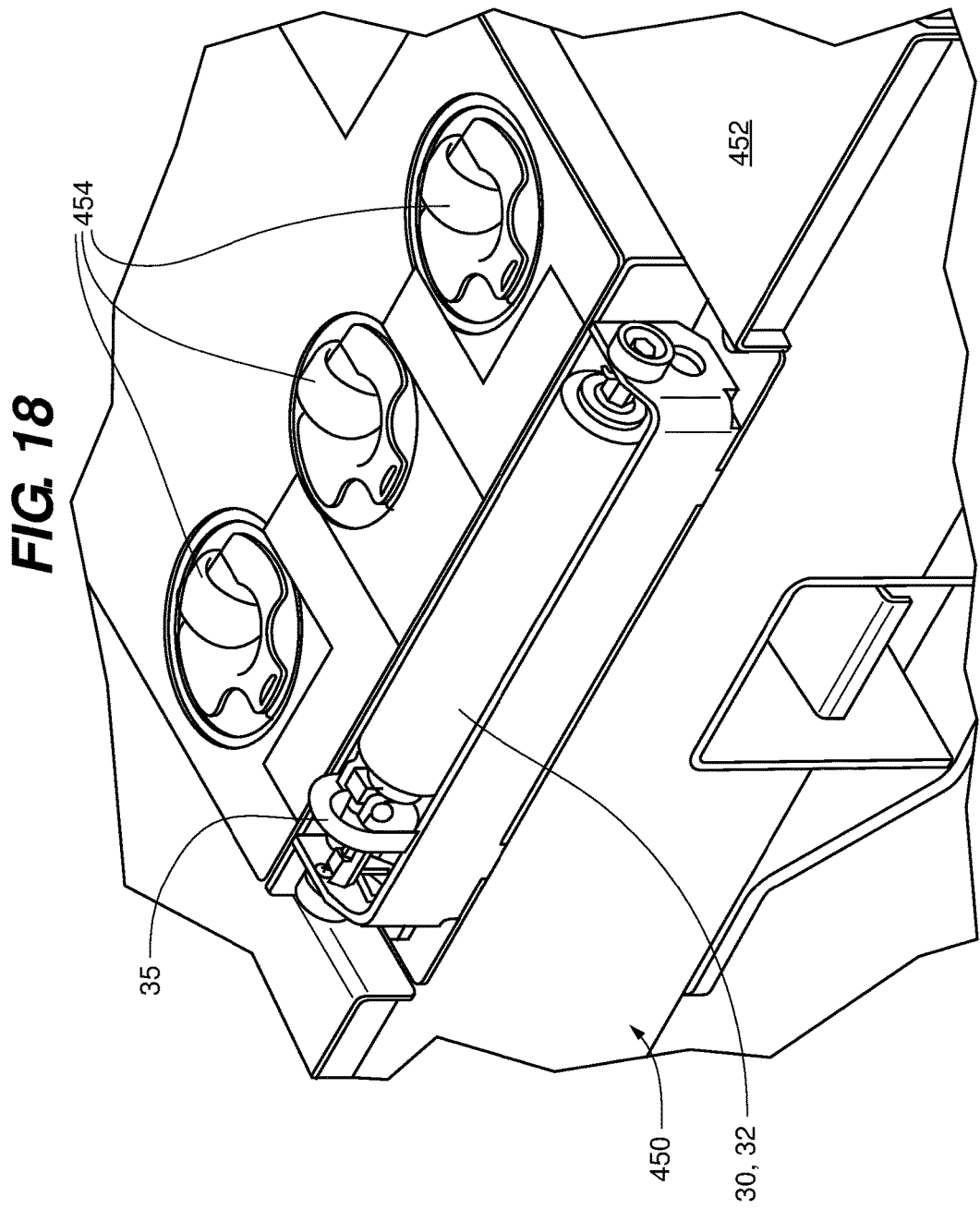

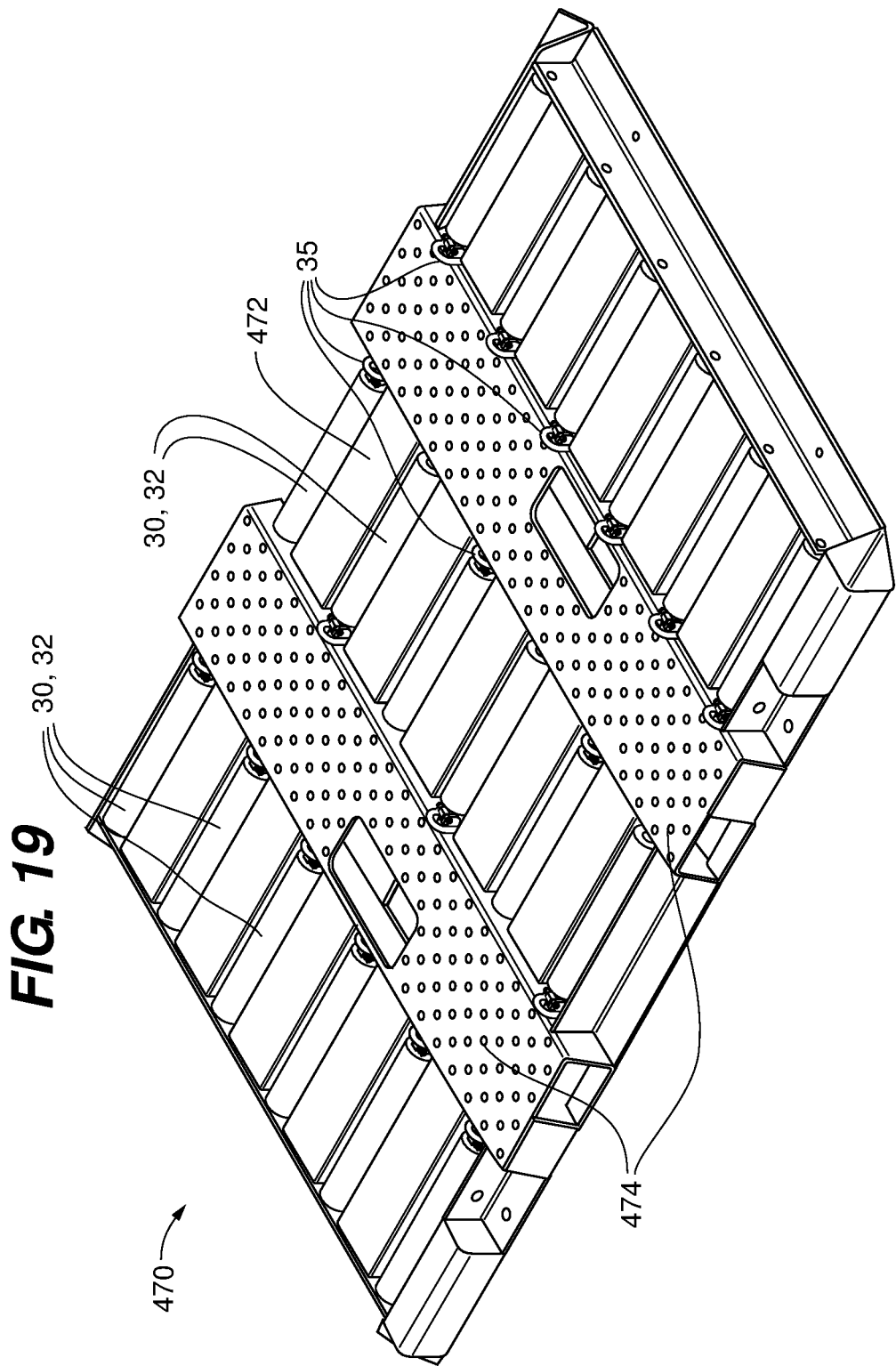

LOCKING ROLLER ASSEMBLIES FOR ROLLER CONVEYORS

RELATED APPLICATIONS

The present application is a National Phase entry of PCT Application No. PCT/US2017/069009, filed Dec. 29, 2017, which claims the benefit of U.S. Provisional Application No. 62/500,042, filed May 2, 2017, and of U.S. Provisional Application No. 62/593,797, filed Dec. 1, 2017, the disclosures of which are hereby incorporated by reference in their entirety.

FIELD OF THE DISCLOSURE

The present disclosure relates generally to roller conveyor systems and more specifically to a lock system for roller conveyors.

BACKGROUND OF THE DISCLOSURE

Roller conveyor systems are used for conveyance of objects such as containers, crates, or pallets, for example, by gravity or momentum. Examples include roller pallets or "truck" pallets used in the cargo bay of an aircraft, a train car, or semi trailer. Other examples include cargo dollies for transporting objects in a warehouse setting. In some instances, roller conveyor systems are attached at a high end to a platform that is being unloaded.

In many roller conveyor applications, the objects are loaded onto the roller conveyors by personnel who physically handle the objects to place and position the objects on the rollers. Safety hazards are often presented in working with such conveyor systems. Personnel generally avoid stepping on the rollers in order to keep their footing. Such avoidance can compromise the way personnel position themselves for lifting and positioning of the objects, which can lead to back and muscle injuries. Personnel may also inadvertently step on the rollers of the roller conveyor while handling the objects and lose their footing because of the rolling action of the rollers. A system that mitigates against these hazards would be welcomed.

SUMMARY OF THE DISCLOSURE

Various embodiments of the disclosure include locking roller assemblies for roller conveyors that, by default, are in a locked configuration to prevent rotation of the roller in the absence of a transferred object. When an object is transferred onto the roller, the roller is unlocked by an actuation mechanism that is passively activated by the object to release the roller as the object passes over the roller, enabling the roller to rotate. When the package or article has passed by the roller, the locking/unlocking mechanism resumes the default configuration of locking the roller and preventing rotation. Accordingly, personnel can stand or walk freely on the locking roller assemblies while handling the objects.

Herein, "passive" actuation or "passively" actuating is refers to an actuation/actuating that is accomplished by the mere presence of the object on the roller, without need for active structures or appurtenances external to the locking roller assembly to perform the locking and unlocking function. The disclosed embodiments are mechanical, self-contained devices that operate passively. There are no electrical components and no need for a computer or other outside controller.

Structurally, various embodiments of the disclosure include a locking roller assembly for a roller conveyor system, comprising a roller configured for rotation about a rotation axis, means for locking the roller to prevent the roller from rotating about the rotation axis, and means for passively actuating the locking roller assembly to unlock the roller when an object is transferred onto the roller, wherein the locking roller assembly defaults to a locked configuration in absence of the object.

In some embodiments, the means for locking the roller includes a lock shaft defining a lock shaft axis that extends parallel to the rotation axis, and a lock clutch coupled to and in fixed rotational relationship with the roller, the clutch being configured for selective coupling with the lock shaft. The means for locking the roller may include a biasing element that biases the locking roller assembly into the locked configuration. The lock clutch may be contained within the roller. In some embodiments, the lock clutch is translatable over the lock shaft along the lock shaft axis for selective coupling and decoupling between the lock shaft and the lock clutch. In some embodiments, the lock shaft is translatable within the lock clutch along the lock shaft axis for selective coupling and decoupling between the lock shaft and the lock clutch. The locking roller assembly may comprise at least one protrusion that extends radially outward from the lock shaft axis of the lock shaft to engage the lock clutch when one of the lock shaft and the lock clutch is in a lock position.

In various embodiments of the disclosure, means for passively actuating the locking roller assembly includes a cam configured to translate one of the lock shaft and the roller from a lock position to an unlock position, and a lever affixed to the cam for actuating the cam, wherein: when the lever and the cam are in the lock position, the means for locking the roller is configured to prevent the roller from rotating about the rotation axis; and when the lever and the cam are in the unlock position, the means for locking the roller is configured to enable the roller to rotate about the rotation axis. In some embodiments, the cam rotates about a pivot axis that extends in a direction that is orthogonal to the lock shaft axis to translate the roller parallel to the lock shaft axis. In some embodiments, when actuated from the lock position to the unlock position, the lever rotates away from the roller in a direction parallel to the lock shaft axis. In some embodiments, the cam is a cam cylinder concentric with and rotatable about the lock shaft axis from the lock position to the unlock position, and the lever is coupled to and in a fixed rotational relationship with the cam cylinder and is rotatable about the lock shaft axis.

In various embodiments of the disclosure, means for locking the roller includes a lock shaft that defines a lock shaft axis that extends parallel to the roller axis, and a lock clutch affixed to the roller, the roller and the lock clutch being translatable parallel to the lock shaft axis from a lock position to an unlock position. In some embodiments, when the lock clutch is in the lock position, the lock clutch is coupled with the lock shaft to prevent the roller from rotating about the rotation axis, and, when the lock clutch is in the unlock position, the lock clutch is decoupled from the lock shaft to enable the roller to rotate about the rotation axis. In some embodiments, means for locking the roller includes a biasing element that biases the locking roller assembly into the locked configuration. The lock clutch may engage an exterior surface of the roller when in the lock position. Some embodiments comprise a second roller, the second roller defining a second rotation axis that is parallel to the rotation axis. In some embodiments, when the lock clutch is in the lock position, the lock clutch is coupled with the second roller to prevent the second roller from rotating about the rotation axis; and, when the lock clutch is in the unlock position, the lock clutch is decoupled from the second roller to enable the second roller to rotate about the rotation axis. In some embodiments, the means for passively actuating the locking roller assembly is disposed between the roller and the second roller.

In various embodiments of the disclosure, means for passively actuating the locking roller assembly includes a plunger assembly translatable along an actuation axis and operatively coupled to the means for locking the roller, the actuation axis extending in a direction that is orthogonal to the rotation axis, wherein: when the plunger assembly is in a lock position, the means for locking the roller is configured to prevent the roller from rotating about the rotation axis; and when the plunger assembly is translated from the lock position to an unlock position, the means for locking the roller is configured to enable the roller to rotate about the rotation axis. The plunger assembly may include one of a rotatable ball and a wheel at a top end of the plunger assembly. In some embodiments, the plunger assembly includes a sleeve and a shaft, the shaft being translatable within the sleeve along the actuation axis.

In various embodiments of the disclosure, locking roller assembly for a roller conveyor is disclosed, comprising: a roller defining and being selectively rotatable about a rotation axis, the roller being suspended at opposing ends by a first support and a second support; a locking mechanism including a lock shaft and a lock clutch; and an actuation mechanism configured to translate the roller and the lock clutch from the lock position to the unlock position. The lock shaft defines a lock shaft axis that extends parallel to the rotation axis, the lock shaft including a first end portion that is mounted to the first support, the lock shaft being in substantially fixed relationship relative to the first support. The lock clutch may be coupled to and in fixed rotational relationship with the roller, the lock clutch being translatable along the lock shaft from a lock position to an unlock position. In some embodiments, when the actuation mechanism is in the lock position, the lock shaft is coupled with the lock clutch, thereby preventing the roller from rotating about the rotation axis, and, when the actuation mechanism is in the unlock position, the lock shaft is decoupled from the lock clutch, thereby enabling the roller to rotate about the rotation axis. The actuation mechanism may include a cam and a lever, the cam being configured to translate the roller and the lock clutch from the lock position to the unlock position, and the lever being affixed to the cam, the lever and the cam being rotatable about a pivot axis to actuate the cam, the pivot axis extending in a direction that is orthogonal to the shaft axis. In some embodiments, when the actuation mechanism is rotated from the lock position to the unlock position, the cam translates the lock clutch along the lock shaft to decouple the lock clutch from the lock shaft, thereby enabling the roller to rotate about the rotation axis. In some embodiments, the lever includes an arcuate portion that, when in a lock position, extends through a plane that is inclusive of an upper-most tangent line of the roller, the plane being parallel to the pivot axis. When in an unlock position, the arcuate portion of the lever may be below and substantially flush with the plane.

In various embodiments of the disclosure, a locking roller assembly for a roller conveyor is disclosed, comprising: a roller defining and being selectively rotatable about a rotation axis; a locking mechanism including a lock clutch and a lock shaft; and an actuation mechanism configured to translate the roller and the lock clutch from the lock position to the unlock position. The lock clutch may be coupled to and in fixed rotational relationship with the roller, the lock shaft defining a lock shaft axis that extends parallel to the rotation axis, the lock shaft being translatable through the lock clutch from a lock position to an unlock position. In some embodiments, when the actuation mechanism is in the lock position, the lock shaft is coupled with the lock clutch, thereby preventing the roller from rotating about the rotation axis, and, when the actuation mechanism is in the unlock position, the lock shaft is decoupled from the lock clutch, thereby enabling the roller to rotate about the rotation axis. In some embodiments, the actuation mechanism includes a cam cylinder and a lever, the cam cylinder being concentric with and rotatable about the lock shaft axis from the lock position to the unlock position. The lever may be coupled to and in a fixed rotational relationship with the cam cylinder about the lock shaft axis. In some embodiments, the cam cylinder defines a cam slot, at least a portion of the cam slot defining a spiral about the lock shaft axis. The locking mechanism may include a follower that extends from the lock shaft into the cam slot, wherein rotation of the cam slot about the lock shaft axis causes the cam cylinder to exert a force on the cam follower, thereby translating the lock shaft along the lock shaft axis. In some embodiments, the lock shaft axis and the rotation axis are coaxial.

For various embodiments of the disclosure, the lock clutch includes a plurality of fingers that define a plurality of notches therebetween. The locking mechanism may include at least one protrusion that extends within the plurality of notches to engage the plurality of fingers when the lever and cam are in the lock position, thereby preventing the roller from rotating about the rotation axis. In some embodiments, the lock clutch translates parallel to the lock shaft axis to pass over and disengage the at least one protrusion when the actuation mechanism is in the unlock position, thereby enabling the roller to rotate about the rotation axis. Alternatively, the at least one protrusion translates parallel to the lock shaft axis to withdraw from the plurality of notches and disengage the plurality of fingers when the actuation mechanism in the unlock position, thereby enabling the roller to rotate about the rotation axis. In some embodiments, the at least one protrusion extends radially outward relative to the lock shaft axis for engagement with the plurality of fingers. The plurality of fingers may extend radially inward, toward the lock shaft axis, and the plurality of fingers may extend radially inward from a continuous outer ring portion of the lock clutch.

In some embodiments, the locking mechanism includes a biasing element coupled to the lock shaft that biases the locking mechanism and the actuation mechanism toward the lock position. The biasing element may be one of a spring and a repelling magnetic arrangement. The spring may be one of a coil spring, a bow spring, and an elastic plug. The locking mechanism may include a pin that extends radially outward relative to the lock shaft axis. In some embodiments, the biasing element is the spring that acts against the pin to bias the locking mechanism toward the lock position. In some embodiments, the spring is the coil spring that is coaxial about the lock shaft axis.

In various embodiments of the disclosure, a locking roller assembly for a roller conveyor is disclosed, comprising a roller defining and being rotatable about a rotation axis, the roller being suspended at opposing ends by first and second supports. A locking mechanism is selectively engageable with the roller. In some embodiments, the locking mechanism includes a lock clutch translatable along an actuation axis from a lock position to an unlock position, the actuation axis extending in a direction that is orthogonal to the rotation axis. An actuation mechanism may include a plunger assembly translatable along the actuation axis, the plunger assembly being coupled to the locking mechanism. In such embodiments, when the locking mechanism and the actuation mechanism are in the lock position, the lock clutch is coupled with the roller to prevent the roller from rotating about the rotation axis, and, when the locking mechanism and the actuation mechanism are in the unlock position, the lock clutch is decoupled from the roller to enable the roller to rotate about the rotation axis.

In various embodiments of the disclosure, a truck pallet is disclosed, comprising a platform, with any of the locking roller assemblies disclosed above mounted to said platform. In various embodiments of the disclosure, a cargo dolly is disclosed, comprising a platform, with any of the locking roller assemblies disclosed above mounted to said platform.

BRIEF DESCRIPTION OF THE DRAWINGS

FIGS. 6 and 7 are perspective, partial cutaway views of the locking roller assembly of FIG. 5 in a locked configuration according an embodiment of the disclosure;

FIG. 8 is a front elevational view of the locking roller of FIG. 6 according to an embodiment of the disclosure;

FIGS. 12 and 13 are perspective, partial cutaway views of the locking roller assembly of FIG. 5 in an unlocked configuration according an embodiment of the disclosure;

FIG. 14 is a front elevational view of the locking roller of FIG. 12 according to an embodiment of the disclosure;

FIG. 17 is a perspective view of a cargo dolly incorporating locking roller assemblies according to an embodiment of the disclosure;

FIG. 18 is an enlarged, partial view a locking roller assembly of the cargo dolly of FIG. 17 according to an embodiment of the disclosure; and FIG. 19 is a roller pallet incorporating locking roller assemblies according to an embodiment of the disclosure.

DETAILED DESCRIPTION OF THE FIGURES

Figure 1:
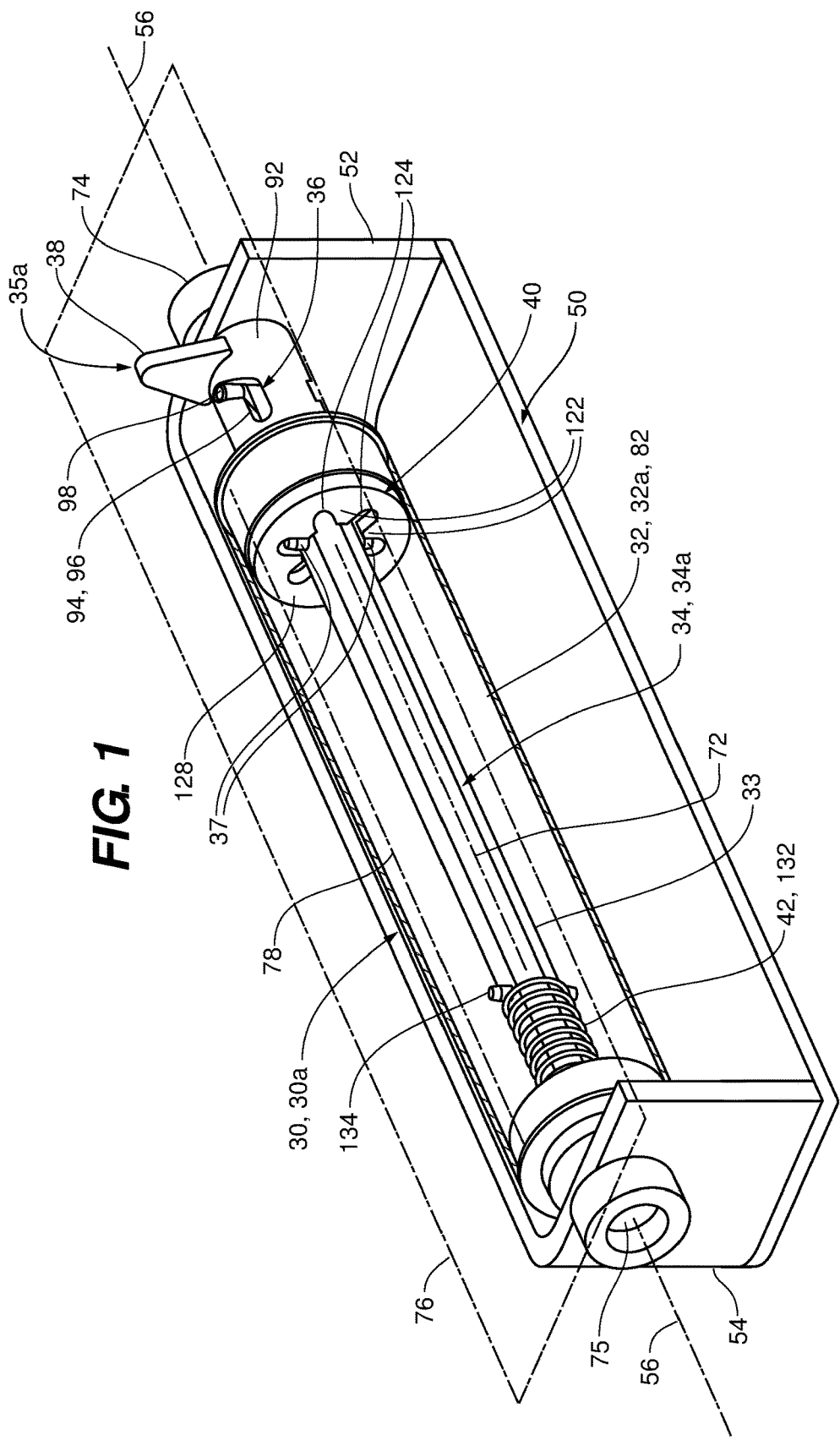
FIG. 1 is a perspective, partial cutaway view of a locking roller assembly and mount in a locked configuration according to an embodiment of the disclosure.
Figure 2:
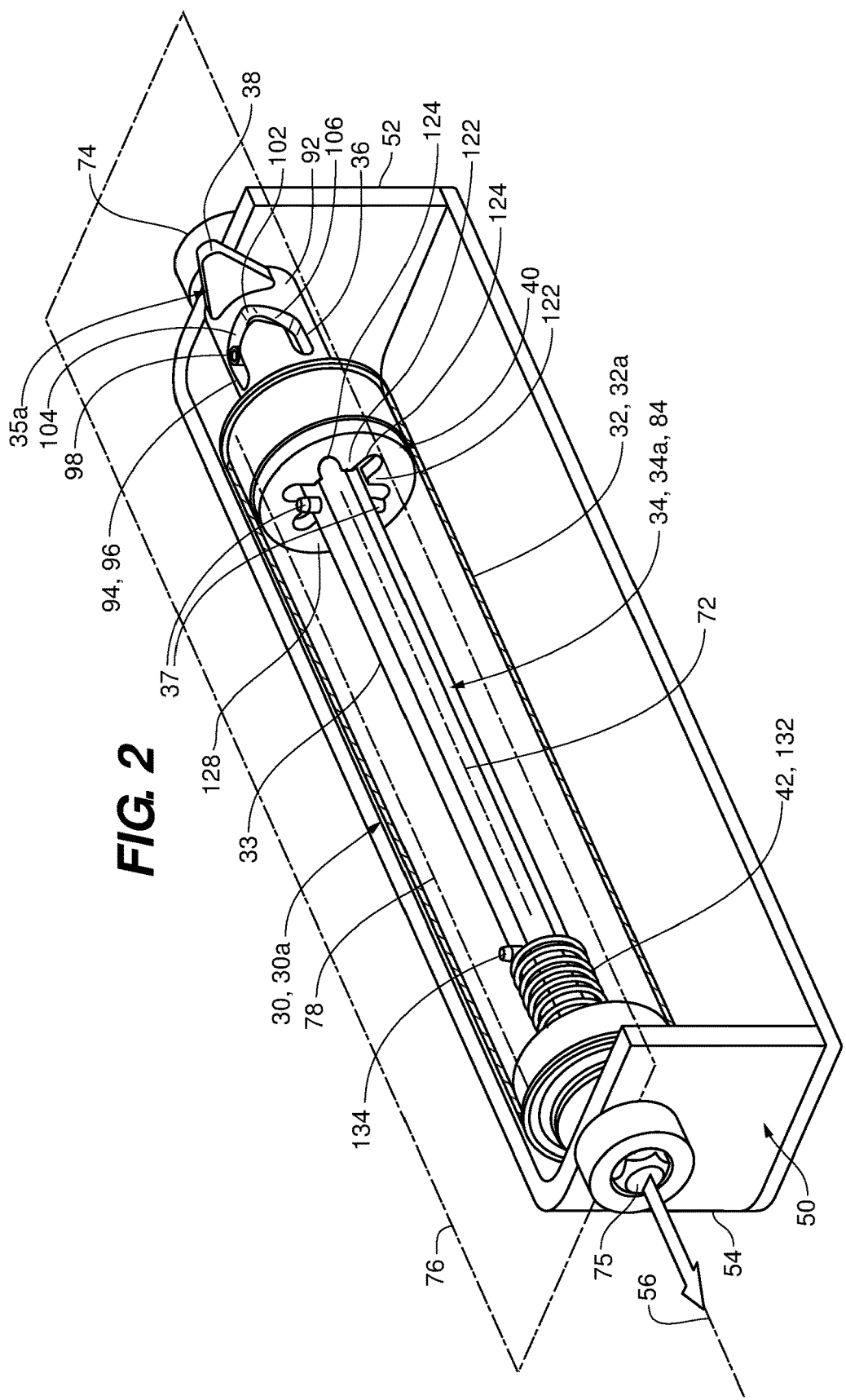
FIG. 2 is a perspective, partial cutaway view of the locking roller assembly and mount of FIG. 1 in an unlocked configuration according to an embodiment of the disclosure

Referring to FIGS. 1 and 2, a locking roller assembly 30a for a roller conveyor is depicted according to an embodiment of the disclosure. The locking roller assembly 30a includes a roller 32a, a locking mechanism 34a, and an actuation mechanism 35a for unlocking the locking roller assembly 30a. The locking mechanism 34a includes a lock shaft 33, a lock clutch 40 through which the lock shaft 33 can be translated, and one or more locking protrusions 37 that extends radially outward from the lock shaft 33. The lock clutch 40 of the locking mechanism 34a is affixed to the roller 32a. In some embodiments, the locking mechanism 34a includes a biasing element 42. For the locking roller assembly 30a, the actuation mechanism 35a includes a cam 36 configured to translate the lock shaft 33, and a lever 38 for actuating the cam 36.

In the depicted embodiment, the locking roller assembly 30a is supported by a roller mount 50 including a first support 52 and a second support 54, the locking roller assembly 30a being suspended at opposing ends by the first support 52 and the second support 54. The roller 32a defines and is selectively rotatable about a rotation axis 56. The lock shaft 33 of the locking mechanism 34a defines a lock shaft axis 72 that extends parallel to the rotation axis 56, the lock shaft 33 including a first end portion 74 that is mounted to the first support 52 and a second end portion 75 mounted to the second support 54. In the depicted embodiment, the lock shaft axis 72 and the rotation axis 56 are coaxial. In some embodiments, the lock shaft 33 is translatable relative to the supports 52 and 54 along the lock shaft axis 72. The lock shaft 33 and locking protrusion(s) 37 of the locking mechanism 34a are configured for translation from a lock position 82 (depicted in FIG. 1) to an unlock position 84 (depicted in FIG. 2). The roller 32a and clutch 40, while rotatable about the rotation axis 56, are in a substantially fixed translational relationship with the supports 52 and 54 along the rotation axis 56.

In some embodiments, the cam 36 is configured to translate the lock shaft 33 from the lock position 82 to the unlock position 84. The lever 38 is rotatable about the lock shaft axis 72 to actuate the cam 36. In the depicted embodiment, the cam 36 is a cam cylinder 92 concentric with and rotatable about the lock shaft axis 72 from the lock position to the unlock position. The lever 38 is coupled to and may be in a fixed rotational relationship with the cam cylinder 92 about the lock shaft axis 72. When in the lock position 82, the lever 38 extends through a substantially horizontal plane 76 that is inclusive of an upper-most line 78 of the roller 32a. In the unlock position 84, the lever 38 is rotated through the plane 76 and into an orientation that is proximate (i.e., substantially flush with) the plane 76.

In some embodiments, the cam cylinder 92 defines a cam slot 94, at least a portion of which may define a spiral portion 96 about the lock shaft axis 72. The locking mechanism 34a may include a follower 98 (e.g., a pin as depicted) that extends into the cam slot 94. In some embodiments, the cam slot 94 extends symmetrically from an apex 102, defining effectively dual slots 104 and 106 that define a mirror image about the lock shaft axis 72 that extends from the apex 102. When in the locked position 82, the follower 98 is seated at the apex 102 of the dual slots 104 and 106.

The lock clutch 40 is coupled to and in fixed rotational relationship with the roller 32a, with the lock clutch 40 and lock shaft 33 of the locking mechanism 34a configured for selective coupling and decoupling. In some embodiments, the lock clutch 40 includes a plurality of fingers 122 that define a plurality of notches 124 therebetween. The protrusion(s) 37 extends radially outward from the lock shaft axis 72 and into the plurality of notches 124 to engage the plurality of fingers 122 when the lever 38 and cam 36 are in the lock position, thereby preventing the roller 32a from rotating about the rotation axis 56. The protrusion(s) 37 translates parallel to the lock shaft axis 72 to withdraw from the plurality of notches 124 and disengage the plurality of fingers 122 of the lock clutch 40 when the lever 38 and cam 36 are in the unlock position, thereby enabling the roller 32a to rotate about the rotation axis 56. In the depicted embodiment, protrusion(s) 37 extends radially outward relative to the lock shaft axis 72 for selective engagement with the plurality of fingers 122. In some embodiments, and the plurality of fingers 122 extend radially inward from a continuous outer ring portion 128 of the lock clutch 40.

In the depicted embodiment, the biasing element 42 is coupled to the lock shaft 33 to bias the locking mechanism 34a and the actuation mechanism 35a toward the lock position. In some embodiments, the biasing element 42 may be one of a spring 132 (depicted) or a repelling magnetic arrangement. By way of non-limiting example, the spring 132 may be one of a coil spring (depicted), a bow spring, and an elastic plug or sleeve. In the depicted embodiment, the spring 132 acts against the protrusion(s) 337 for the biasing. In some embodiments, the protrusion(s) 37 are defined by a pin 134 that extends radially outward relative to the lock shaft axis 72, the pin 134 and spring 132 being configured to so that the spring 134 acts against the pin 132 to bias the locking mechanism 34a.

Functionally, when the lever 38 and the cam 36 are in the lock position, the lock shaft 33 and lock clutch 40 of the locking mechanism 34a are coupled, thereby preventing the roller 32a from rotating about the rotation axis 56. For the depicted arrangement of the cam cylinder 92, rotation of the cam slot 94 about the lock shaft axis 72 causes the cam cylinder 92 to exert a force on the cam follower 98, thereby translating the lock shaft 33 along the lock shaft axis 72. The cam slot 94 enables a camming action that drives the follower 98 parallel to the lock shaft axis 72, which in turn drives the lock shaft 33 along the lock shaft axis 72. Accordingly, when the lever 38 and cam 36 are rotated from the locked position to the unlock position, the cam 36 translates the lock shaft 33 along the lock shaft axis 72 to disengage the locking protrusion(s) 37 and the lock clutch 40 of the locking mechanism 34a, thereby enabling the roller 32a to rotate about the rotation axis 56. The skilled artisan will recognize that the spiral portion 96 (when implemented) of the cam slot 94 may reduce friction between the cam slot 94 and the follower 98 during the camming action relative to a straight inclined slot.

Also, the dual slots 102 and 104 enable the cam cylinder 92 to be operated in either direction. That is, the cam cylinder 92 may be rotated in either direction about the lock shaft axis 72 to define the unlocked position 84 and release the roller 32a. In other embodiments, the passage of objects over the locking roller assembly 30a in only one direction may be desired. In such embodiments, only one of the dual slots 102 or 104 is defined in the cam cylinder 92, enabling release of the locking roller assembly 30a in only one rotational direction. In such an embodiment, the lever 38 of the locking roller assembly 30a acts as a stop in the non-rotating direction. This aspect may enable personnel to push objects in an upward incline over the locking roller assembly 30a without fear of the object rolling backwards due to gravity.

In operation, when an object being transferred along the roller conveyor system engages the roller 32a, the object contacts the lever 38, causing the lever 38 to rotate proximate the plane 76. Rotation of the lever 38 causes the cam 36 to act against the cam follower 98 and translate the lock shaft 33 along the lock shaft axis 72, thereby decoupling the lock shaft 33 and the lock clutch 40 of the locking mechanism 34a to enable the roller 32a to rotate about the rotation axis 56. Thus, when the object is engaged with and passes over the roller 32a, the roller 32a can rotate. As the object passes by the roller 32a, the object no longer holds the lever 38 in the unlock position. In the depicted embodiment, the force exerted by biasing element 42 reverses the action of the cam 36 to restore the coupling between the lock shaft 33 and the lock clutch 40 of the locking mechanism 34a, thus locking the roller 32a and returning the lever 38 to the lock (upright) position.

Herein, the locking roller assemblies are referred to generically or collectively by reference character 30, with specific locking rollers being referred to by the reference character 30 followed by a letter suffix (e.g., locking roller 30a). Similarly: the rollers are referred to generically or collectively by reference character 32, with specific rollers being referred to by the reference character 32 followed by a letter suffix (e.g., roller 32a); the locking mechanisms are referred to generically or collectively by reference character 34, with specific locking mechanisms being referred to by the reference character 34 followed by a letter suffix (e.g., locking mechanism 34a); and the actuation mechanisms are referred to generically or collectively by reference character 35, with specific actuation mechanisms being referred to by the reference character 35 followed by a letter suffix (e.g., actuation mechanism 35a).

Figure 3:
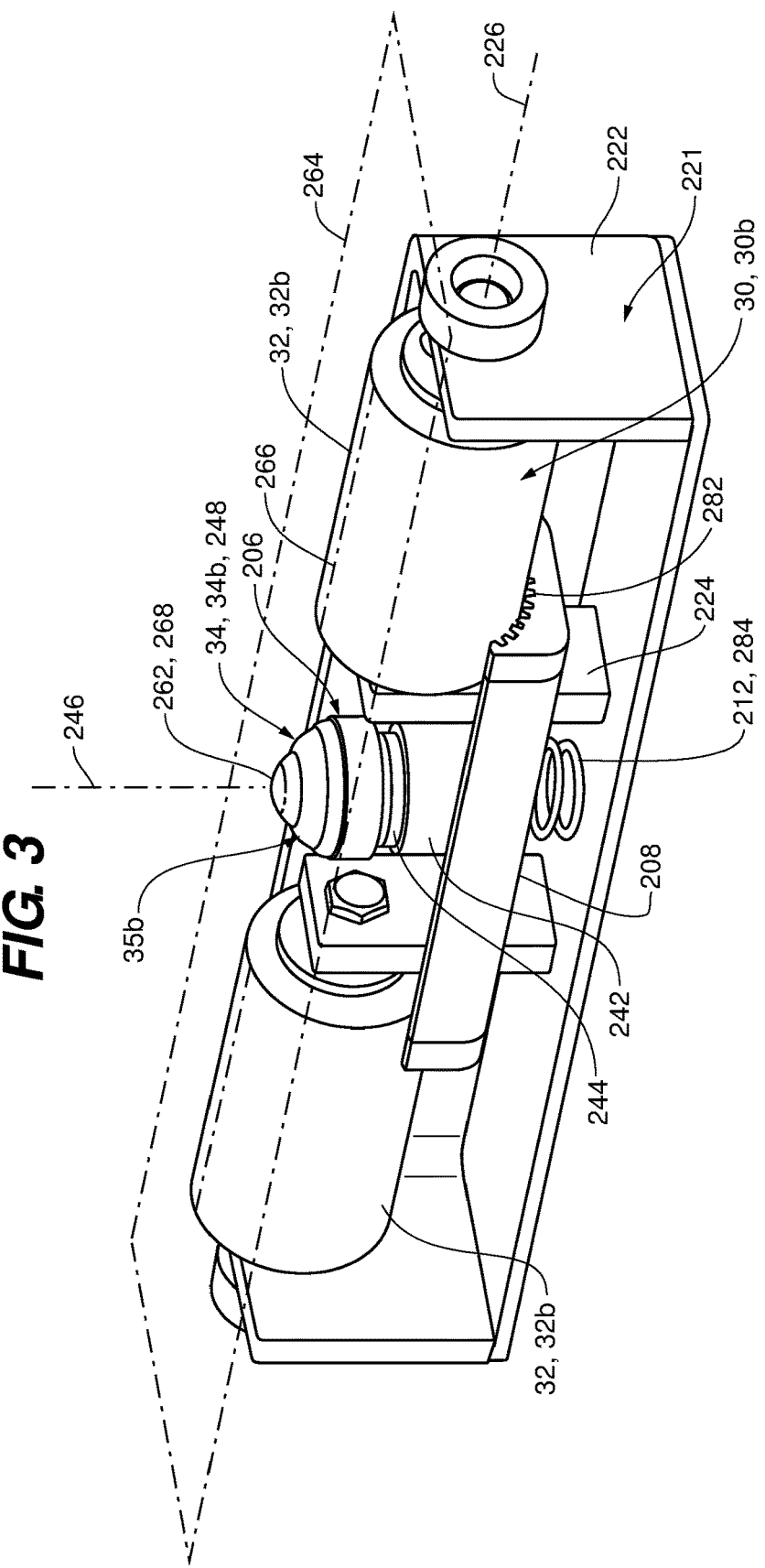
FIG. 3 is a perspective view of a locking roller assembly and mount in a locked configuration according to an embodiment of the disclosure.
Figure 4:
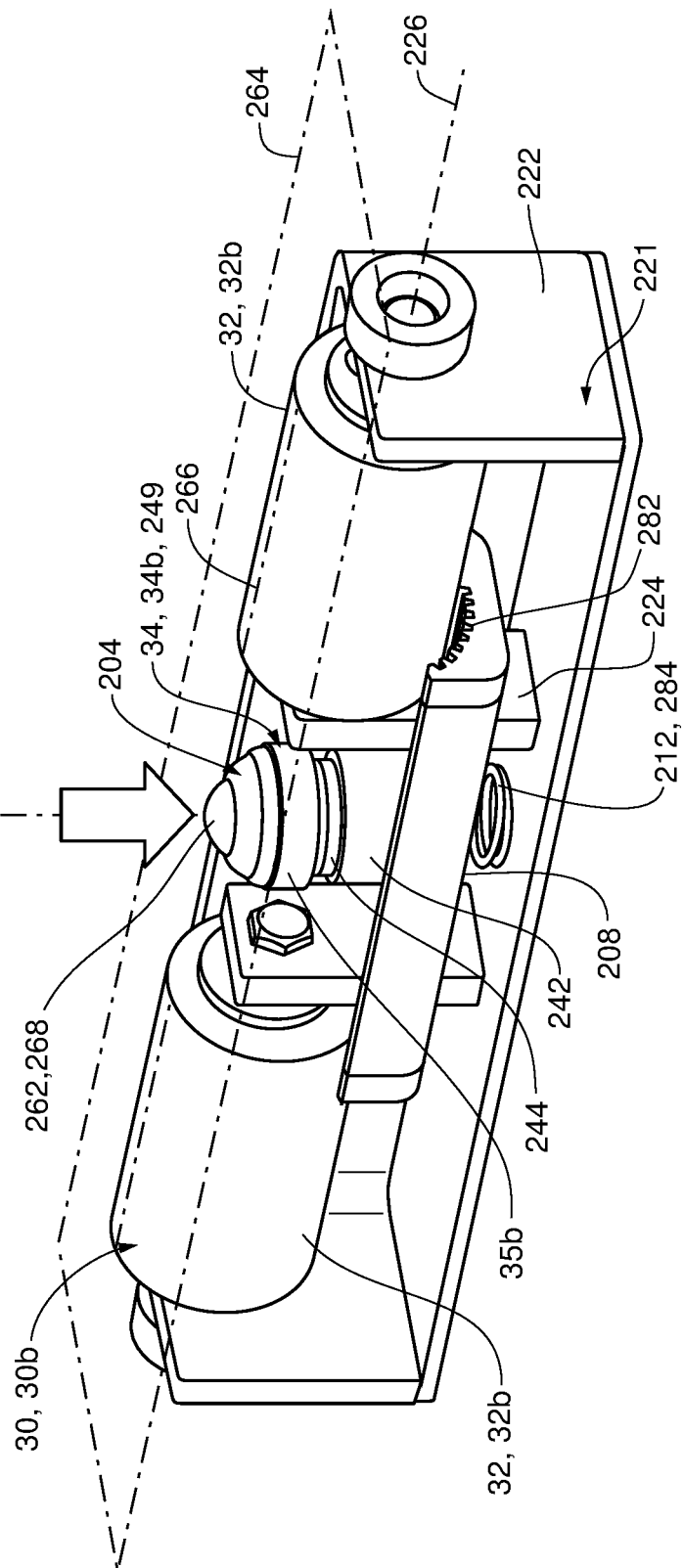
FIG. 4 is a perspective view of the locking roller assembly and mount of FIG. 3 in an unlocked configuration according to an embodiment of the disclosure.
Figure 5:
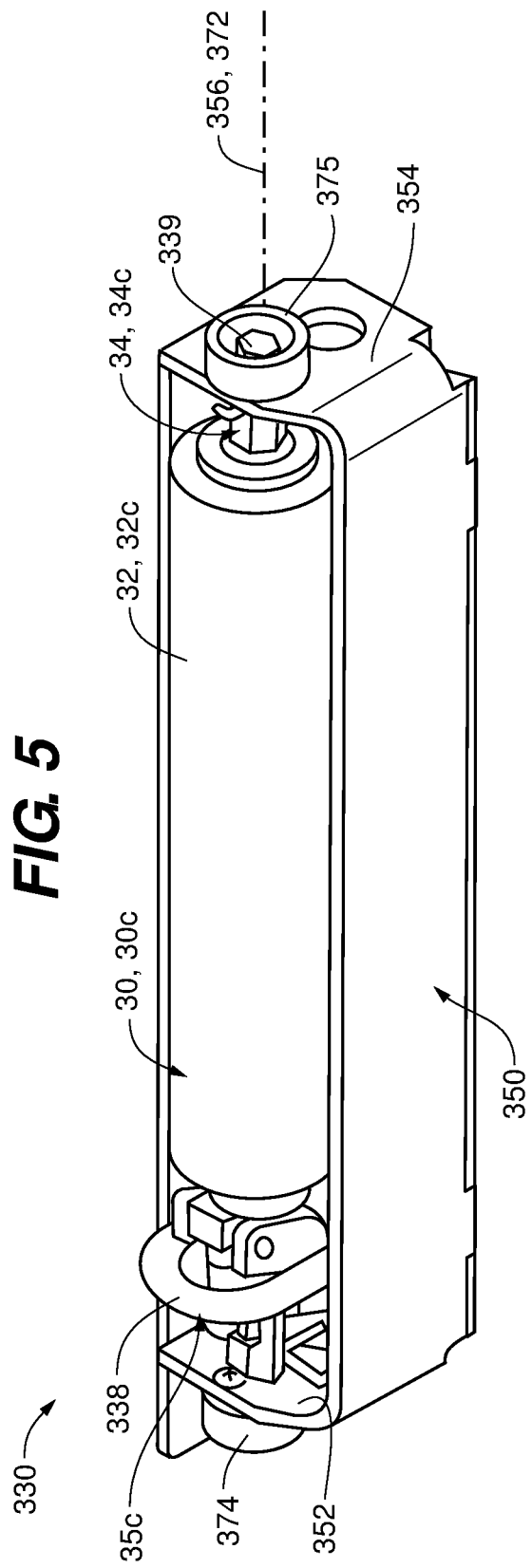
FIG. 5 is a perspective view of a locking roller assembly and mount according to an embodiment of the disclosure.
Figure 9:
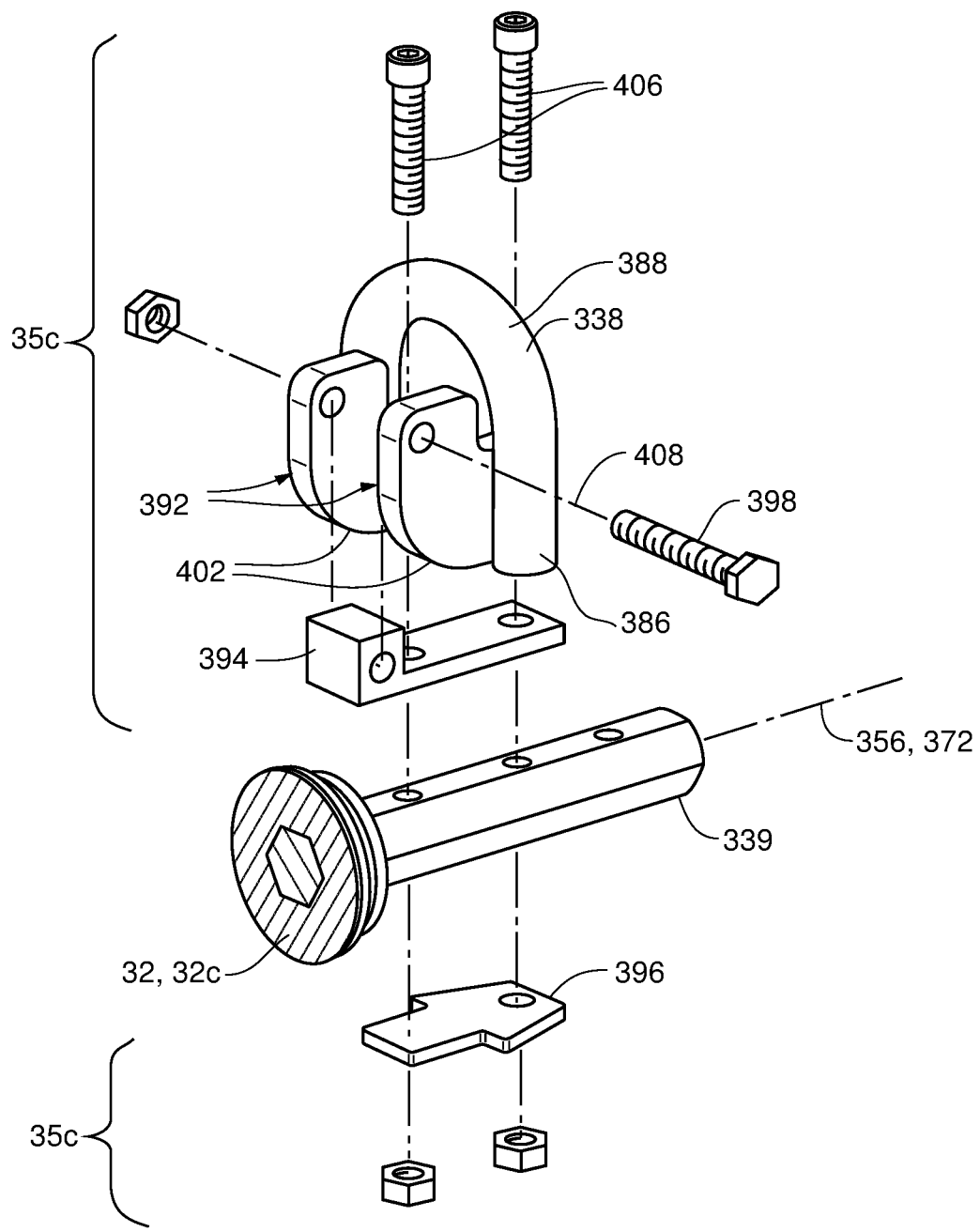
FIG. 9 is an exploded view of an actuator assembly implemented in the locking roller assembly of FIG. 5 according to an embodiment of the disclosure.
Figure 10:
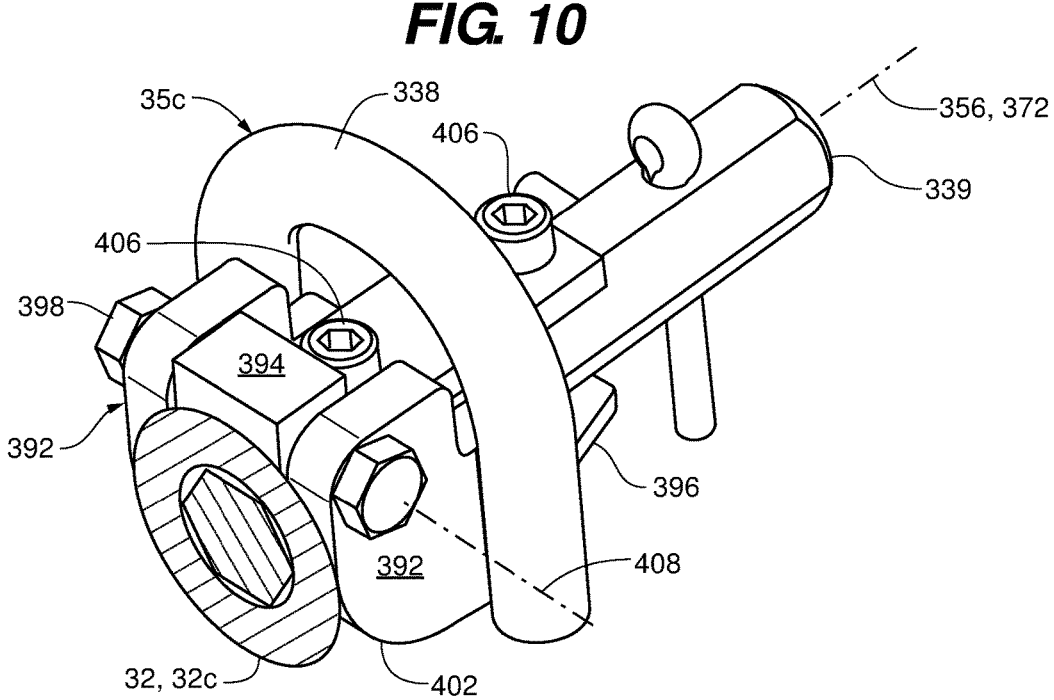
FIGS. 10 and 11 are perspective, assembled views of the actuator assembly of FIG. 9 in the locked configuration according to an embodiment of the disclosure.
Figure 11:
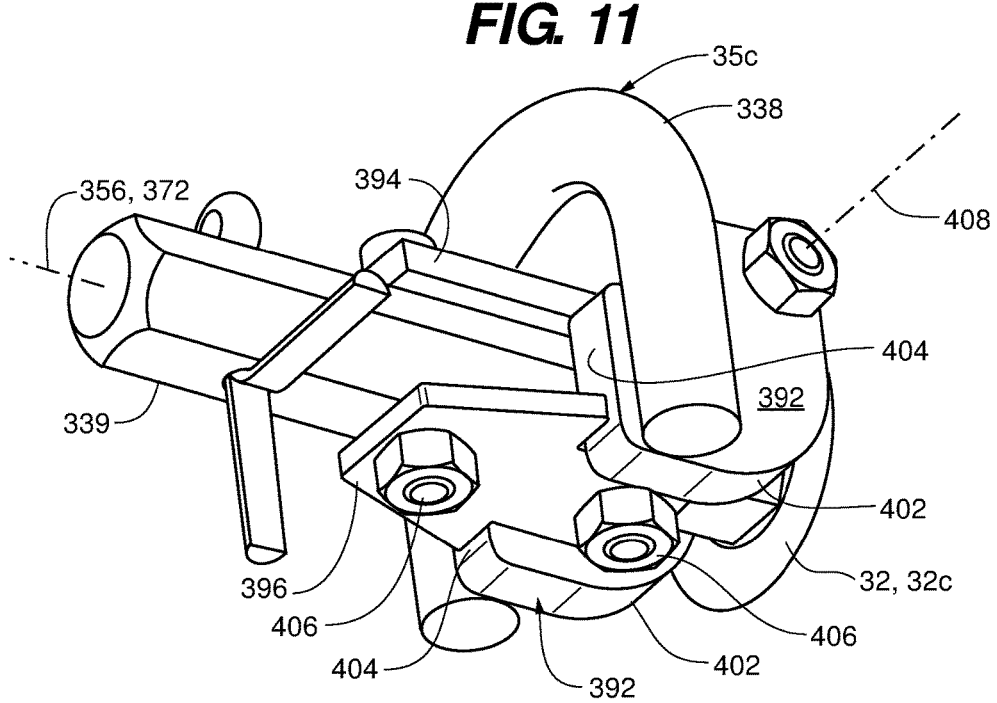

Referring to FIGS. 3 and 4, a locking roller assembly 30b for a roller conveyor is depicted in a second embodiment of the disclosure. The locking roller assembly 30b includes a roller 32b, a locking mechanism 34b, and an actuation mechanism 35b for unlocking the locking roller assembly 30b. The locking roller assembly 30b may be supported by a roller mount 221 having a first support 222 and a second support 224, with the locking roller assembly 30b being suspended at opposing ends by the first support 222 and the second support 224.

The roller 32b defines and is rotatable about a rotation axis 226. The locking mechanism 34b is selectively coupled with the roller(s) 32b. The locking mechanism 34b includes a lock clutch 208, and, in some embodiments, a biasing element 212. In the depicted embodiment, there are two rollers 32b separated by and operatively coupled to the locking mechanism 34b and the actuation mechanism 35b.

The actuation mechanism 35b includes a plunger assembly 206 having a stationary sleeve 242 that is in fixed relation with the first and second supports 222 and 224, and a shaft 244 that is translatable within the sleeve 242 along an actuation axis 246. The shaft 244 is coupled to the lock clutch 208 of the locking mechanism 34b and is in fixed relationship with the lock clutch 208 along the actuation axis 246. The actuation axis 246 may extend in a direction that is orthogonal to the rotation axis 226. A top end 262 of the plunger assembly 206 extends through a plane 264 defined by an upper-most tangent line 266 of the roller(s) 32b, the plane 264 being orthogonal to the actuation axis 246. In some embodiments, a rotatable ball 268 (or, alternatively, a pivoting wheel) defines the top end 262 of the plunger assembly 206, the rotatable ball 268 being mounted to the shaft 244 and a portion of the rotatable ball 268 extending proud through the plane 264.

The lock clutch 208 of the locking mechanism 34b is coupled to the plunger assembly 206 of the actuation mechanism 35b and translatable along the actuation axis 246 from a lock position 248 (FIG. 3) to an unlock position 249 (FIG. 4). In some embodiments, the lock clutch 208 includes a plurality of teeth 282 for gripping the roller 32b when in the lock position 248. In some embodiments, one or more teeth (not depicted) are coupled to the roller 32b which are configured to engage the plurality of teeth 282 when the lock clutch 208 is in the lock position.

In the depicted embodiment, the biasing element 212 is coupled to the plunger assembly 206 of the actuation mechanism 35b and lock clutch 208 of the locking mechanism 34b to bias the plunger assembly 206 and the lock clutch 208 toward the lock position 248. In some embodiments, the biasing element 212 may be one of a spring 284 (depicted) or a repelling magnetic arrangement. By way of non-limiting example, the spring 284 may be one of a coil spring (depicted), a bow spring, and an elastic plug or sleeve.

Functionally, when the plunger assembly 206 of the actuation mechanism 35b and the lock clutch 208 of the locking mechanism 34b are in the lock position 248, the lock clutch 208 is coupled with the roller 32b to prevent the roller 32b from rotating about the rotation axis 226. In the depicted embodiment, the plurality of teeth 282 bear against the outer surface of the roller 32b to effect the locking of the roller 32b. When the plunger assembly 206 and lock clutch 208 are translated from the lock position 248 to the unlock position 249, the clutch 208 is decoupled from the roller 32b to enable the roller 32b to rotate about the rotation axis 226. In some embodiments, at least a portion of the roller 32b that contacts the plurality of teeth 282 may be of a high friction material, such as rubber or BAKELITE®, for better gripping by the plurality of teeth 282. Alternatively or in addition, the plurality of teeth 282 may be comprised of the high friction material. For embodiments where the roller 32b includes one or more teeth (not depicted), the one or more teeth engage the plurality of teeth 282 for a positive locking action.

In operation, when an object being transferred along the roller conveyor system engages the roller 32b, the actuation mechanism 35b is actuated when the object contacts the plunger assembly 206, causing the plunger assembly 206 to depress downward, so that an upper extremity of the top end 262 is depressed toward and proximate to the plane 264. Depression of the plunger assembly 206 translates the shaft 244 along the actuation axis 246, causing the lock clutch 208 to disengage the roller 32b, thereby enabling the roller 32b to rotate about the rotation axis 226. The rolling action of the rotatable ball 268 enables the object to roll over the plunger assembly 206 without significant resistance. Accordingly, when the object is engaged with and passes over the roller 32b, the roller 32b can rotate. As the object passes by the roller 32b, the actuation mechanism 35b is released and no longer holds the plunger assembly 206 in the unlock position 249. In the depicted embodiment, the force exerted by biasing element 212 restores the lock clutch 208 into engagement with the roller 32b, thus locking the roller 32b and returning the top end 262 of the plunger assembly 206 to the lock position 248 above the plane 264.

Referring to FIGS. 5 through 8, a locking roller assembly 30c for a roller conveyor is depicted according to a third embodiment of the disclosure. The locking roller assembly 30c includes a roller 32c, a locking mechanism 34c, and an actuation mechanism 35c for unlocking the locking roller assembly 30c. The locking mechanism 34c includes a lock shaft 339, a lock clutch 340 that can be translated over the lock shaft 339, and at least one locking protrusion 337 that extends radially outward from the lock shaft 339. The lock clutch 340 is affixed to the roller 32c. In some embodiments, the locking mechanism 34c includes a biasing element 342. For the locking roller assembly 30c, the actuation mechanism 35c is a lateral actuator assembly, configured to laterally translate the roller 32c and affixed lock clutch 340 over the lock shaft 339.

The locking roller assembly 30c may be supported by a roller mount 350 including a first support 352 and a second support 354. The lock shaft 339 of the locking mechanism 34c is suspended at opposing ends by the first support 352 and the second support 354. The roller 32c is selectively rotatable about a rotation axis 356. The lock shaft 339 of the locking mechanism 34c defines a shaft axis 372 that extends parallel to the rotation axis 356, the lock shaft 339 including a first end portion 374 that is mounted to the first support 352 and a second end portion 375 mounted to the second support 354. In the depicted embodiment, the lock shaft axis 372 and the rotation axis 356 are coaxial. Also in the depicted embodiment, the lock shaft 339 and protrusion(s) 337 are in a static relationship relative to the first and second supports 352 and 354. That is, the lock shaft 339 neither rotates nor laterally translates relative to the supports 352 and 354. Instead, the roller 32c and the lock clutch 340 are translatable relative to the lock shaft 339 along the lock shaft axis 372. By this translation, the roller 32c is can be configured in one of a lock position 382 (depicted in FIGS. 5 through 8) and an unlock position 384 (depicted in FIGS. 12 through 14A). In the depicted embodiment, the actuator assembly 35c is configured to laterally translate the roller 32c.

The lock clutch 340 is coupled to and in fixed rotational relationship with the roller 32c, with the lock clutch 340 being selectively engageable with the protrusion(s) 337. In some embodiments, the lock clutch 340 includes a plurality of fingers 422 that define a plurality of notches 424 therebetween (FIG. 6). The locking mechanism 34c may include at least one protrusion 337 that extends within the plurality of notches 424 to engage the plurality of fingers 422 when the locking mechanism 34c is in the lock position 382, thereby preventing the roller 32c from rotating about the rotation axis 356. The roller 32c and lock clutch 340 translate parallel to the lock shaft axis 372 to pass over the protrusion(s) 337, thereby disengaging the protrusion(s) 337 from the plurality of notches 424 and the plurality of fingers 422 of the lock clutch 340 when the locking mechanism 34c is in the unlock position 384, thereby enabling the roller 32c to rotate about the rotation axis 356. In the depicted embodiment, protrusion(s) 337 extends radially outward relative to the lock shaft axis 372 for selective engagement with the plurality of fingers 422. In some embodiments, and the plurality of fingers 422 extend radially inward from a continuous outer ring portion 428 of the lock clutch 340.

In the depicted embodiment, the biasing element 342 is coupled to the lock shaft 339 to bias the locking, mechanism 34c and actuator assembly 35c into the lock position 382. In some embodiments, the biasing element 342 may be one of a spring 432 (depicted) or a repelling magnetic arrangement. By way of non-limiting example, the spring 432 may be one of a coil spring (depicted), a bow spring, and an elastic plug or sleeve. In the depicted embodiment, the spring 432 acts against the protrusion(s) 337 for the biasing. In some embodiments, the protrusion(s) 337 is defined by a pin 434 that extends radially outward relative to the lock shaft axis 372, the pin 434 and spring 432 being configured to so that the spring 432 acts against the pin 434 to bias the locking mechanism 34c.

Referring to FIGS. 9 through 11, 15, and 16, the actuator assembly 35c is depicted in more detail according to an embodiment of the disclosure. The actuator assembly 35c includes a lever 338, at least one cam 392, a yoke 394, a stop 396, and a pivot pin 398. The lever 338 is fixedly coupled to the cam(s) 392, for example by welding or other conventional coupling arrangements available to the artisan. In the depicted embodiment, the lever 338 is formed of a round rod 386 having a circular cross-section 387 (FIG. 14A) that defines an arcuate portion 388. The cam(s) 392 includes an arcuate surface 402 and a stop engagement surface 404. In the depicted embodiment, the yoke 394 and stop 396 are diametrically opposed about the lock shaft 339 of the locking mechanism 34c, and attached to the lock shaft 339 with fasteners 406 that pass through the yoke 394, lock shaft 339, and stop 396. The cam(s) 392 are pivotally mounted to the yoke 394 with the pivot pin 398, the pivot pin 398 defining a pivot axis 408, the pivot axis 408 extending in a direction that is orthogonal to the lock shaft axis 372. The lever 338 is offset from the pivot axis 408 by a distance X (FIG. 8).

Referring to FIGS. 12 through 16, the locking roller 30c is depicted in the unlock position 384 according to an embodiment of the disclosure. The lever 338 and cam(s) 392 are rotatable about the pivot axis 408 for actuation of the locking mechanism 34c. In the unlock position 384, the arcuate surface 402 is extended laterally against the end of the roller 32c to laterally translate the roller 32c. When in the lock position 382, the lever 338 extends through a plane 376 inclusive of an upper-most tangent line 378 (FIGS. 7, 13, 14, and 14A) of the roller 32c and extending parallel to the pivot axis 408, the plane 376 extending above the first and second supports 352 and 354. In the unlock position, the lever 338 is rotated laterally outward and away from the roller 32c so that an upper extremity of the lever 338 approaches plane 376.

Figure 14A:
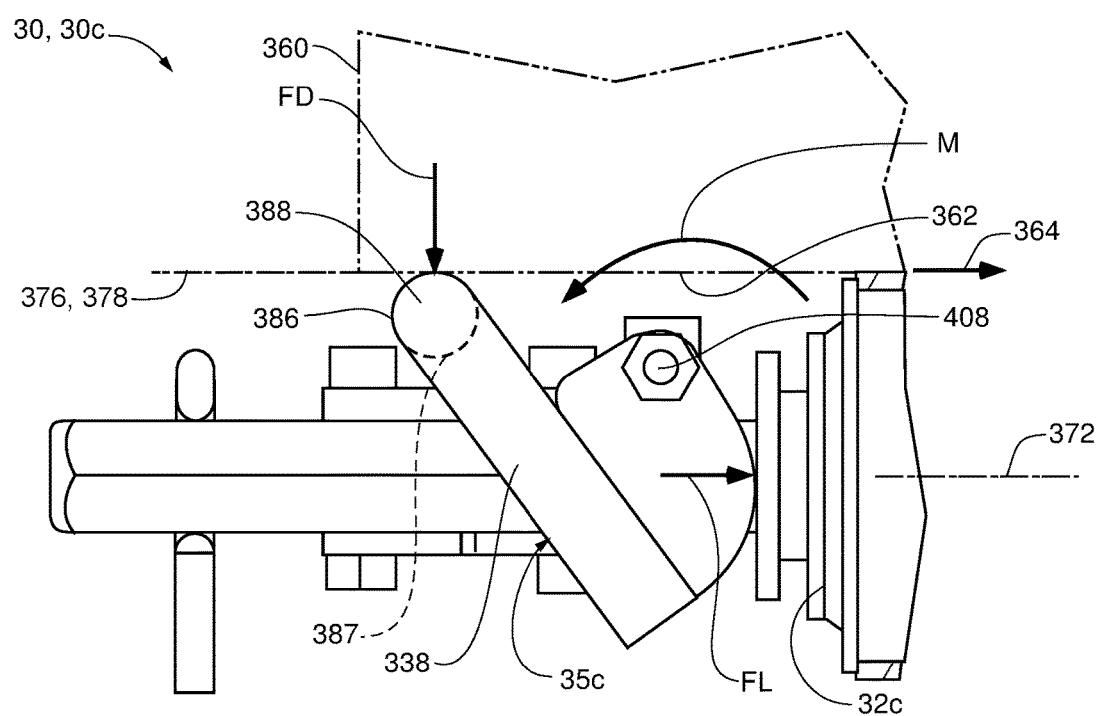
FIG. 14A is an enlarged, partial view of FIG. 14.
Figure 15:
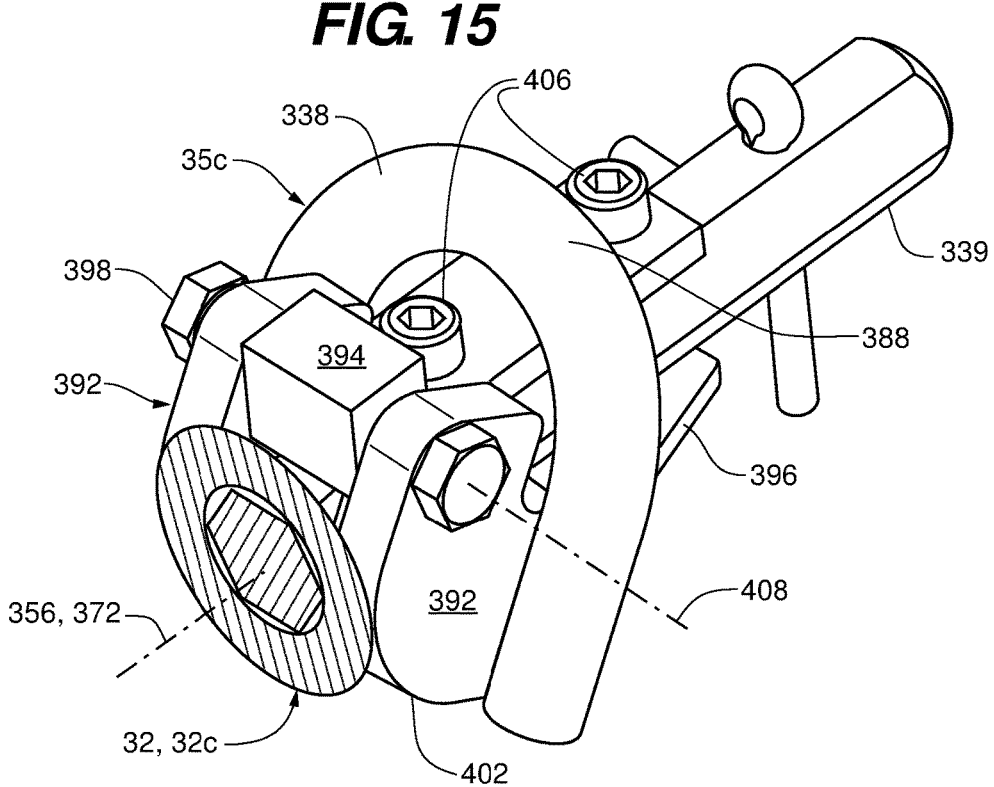
FIGS. 15 and 16 are perspective, assembled views of the actuator assembly of FIG. 9 in the unlocked configuration according to an embodiment of the disclosure.
Figure 16:
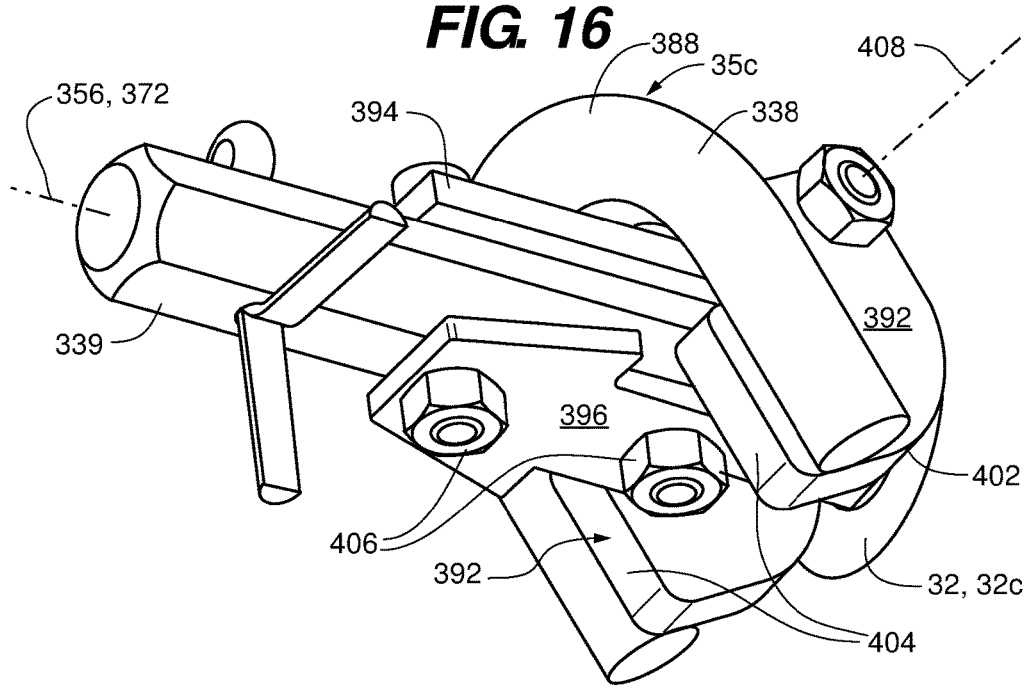

In operation, when the actuator assembly 35c is in the lock position 382, the lock shaft 339 and the lock clutch 340 of the locking mechanism 34c are coupled, thereby preventing the roller 32c from rotating about the rotation axis 356 (FIGS. 6 through 8). When an object 360 (FIGS. 12, 14, and 14A) passes over the locking roller 30c, the object slides up onto the arcuate portion 388 of the lever 338, thereby generating a downward force FD on the lever 338 due to gravity. The downward force FD causes a moment M about the pivot axis 408 because of the offset distance X between the lever 338 and the pivot axis 408. In this way, the actuator assembly 35c is pivoted about the pivot axis 408 into the unlock position 384, causing the cam(s) 392 to rotate toward and exert a lateral force FL on roller 32c. The arcuate portion 388 of the lever rotates laterally away from the roller 32c, which may cause the arcuate portion 388 to slide against a contacting surface 362 of the object 360 as it pivots downward toward the plane 376 (FIG. 14A). The circular cross-section 387 of the round rod 386 facilitates the sliding action against the contacting surface of the object.

Actuation of the actuation mechanism 35c causes the arcuate surface 402 of the cam(s) 392 to slidingly engage with the end of the roller 32c to exert the lateral force FL and laterally translate the roller 32c relative to the locking mechanism 34c along the lock shaft axis 372. The lateral translation is depicted by arrow 364. Accordingly, the upper-most tangent line 378 of the roller 32c may also slide laterally against the contacting surface 362 of the object, as depicted in FIG. 14A. The lateral translation of the roller 32c causes the lock clutch 340 to pass over the protrusion(s) 337 of the locking mechanism 34c (FIGS. 12-14), thereby disengaging the lock clutch 340 from the protrusion(s) 337 and enabling the roller 32c to rotate about the rotation axis 356. The spring 432 biases the roller 32c laterally toward the actuator assembly 35c, so that in the lock position 382, the stop engagement surface 404 of the cam(s) 392 is engaged against the stop 396.

Referring to FIGS. 17 through 19, example embodiments incorporating the locking roller assemblies 30 of the present disclosure into various roller conveyance systems are depicted in embodiments of the disclosure. In the depictions of FIGS. 17 through 19, the locking roller assemblies 30c are depicted. However, it is understood, and the skilled artisan will readily recognize, that any of the locking roller assemblies 30 disclosed herein may be implemented in the example embodiments.

In FIGS. 17 and 18, a cargo dolly 450 is depicted according to an embodiment of the disclosure. The cargo dolly 450 includes a platform 452 to which a plurality of unidirectional rollers 454 may be mounted. Standard equipment on the cargo dolly 450 may include pallet stops 456 that lift an object (not depicted) above the rollers 454 to secure the object in place, and lower the object onto the rollers 454 to enable the object to be transferred over the platform 452. The cargo dolly 450 further includes locking roller assemblies 30 disposed proximate the edges of the platform 452. As described above, the locking roller assemblies 30 default to a locked configuration such that the rollers to not rotate. Rotation of the rollers is enabled when an object, such as a crate or pallet, passes onto and passively actuates the locking roller assembly 30 to release or unlock the roller 32 and enable the roller 32 to rotate.

In FIG. 19, a roller or "truck" pallet 470 is depicted according to an embodiment of the disclosure. The truck pallet 470 includes a platform 472 onto which a plurality of the locking roller assemblies 30 are mounted, the rollers 32 extending proud above the platform 472. In the depicted embodiment, the platform 472 includes tread areas 474 on the interior portion of the platform 472. The actuating mechanisms 35 of the locking roller assemblies 30 are disposed proximate the tread areas 474. The truck pallet 474 may also include pallet stops (not depicted), akin to the pallet stops 456 of the cargo dolly 450.

Functionally, the locking roller assemblies 30 incorporated into the example cargo dolly 450 and truck pallet 470 enable personnel to step on the rollers 32 without having the rollers 32 rotate, which can cause imbalance and loss of footing. For the cargo dolly 450, the locking roller assemblies 30 disposed proximate the edges of the platform 452 enable personnel handling objects for transfer to step on the edges of the platform 452 without loss of footing or balance. For the truck pallet 470, where all the rollers are with locking roller assemblies 30, personnel can walk on any portion of the platform 472 the rollers 32 without imbalance or loss of footing. It is noted that, even if personnel step on and activate an actuation mechanism 35, the foot that activated the actuation mechanism 35 will not rest solely on a roller 32, but will bridge to the actuation mechanism 35. Accordingly, even stepping on an actuation mechanism will not necessarily cause imbalance or loss of footing.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A locking roller assembly for a roller conveyor system, comprising:
    a roller configured for rotation about a rotation axis;
    means for locking said roller to prevent said roller from rotating about said rotation axis; and
    means for passively actuating said locking roller assembly to unlock said roller when an object is transferred onto said roller,
wherein said means for locking said roller includes:
    a lock shaft defining a lock shaft axis that extends parallel to said rotation axis; and
    a lock clutch coupled to and in fixed rotational relationship with said roller, said clutch being configured for selective coupling with said lock shaft, and
wherein the locking roller assembly defaults to a locked configuration in absence of said object.

2. The locking roller assembly of claim 1, wherein said lock clutch is translatable over said lock shaft along said lock shaft axis for selective coupling and decoupling between said lock shaft and said lock clutch.

3. The locking roller assembly of claim 1, wherein said lock shaft is translatable within said lock clutch along said lock shaft axis for selective coupling and decoupling between said lock shaft and said lock clutch.

4. The locking roller assembly of claim 1, comprising at least one protrusion that extends radially outward from said lock shaft axis of said lock shaft to engage said lock clutch when one of said lock shaft and said lock clutch is in a lock position.

5. A locking roller assembly for a roller conveyor system, comprising:
    a roller configured for rotation about a rotation axis;
    means for locking said roller to prevent said roller from rotating about said rotation axis; and
    means for passively actuating said locking roller assembly to unlock said roller when an object is transferred onto said roller,
    wherein said means for passively actuating said locking roller assembly includes:
    a cam configured to translate one of said lock shaft and said roller from a lock position to an unlock position; and
    a lever affixed to said cam for actuating said cam, and
    wherein:
        when said lever and said cam are in said lock position, said means for locking said roller is configured to prevent said roller from rotating about said rotation axis, and
        when said lever and said cam are in said unlock position, said means for locking said roller is configured to enable said roller to rotate about said rotation axis; and
    wherein the locking roller assembly defaults to a locked configuration in absence of said object.

6. The locking roller assembly of claim 5, wherein said cam rotates about a pivot axis that extends in a direction that is orthogonal to said lock shaft axis to translate said roller parallel to said lock shaft axis.

7. A locking roller assembly for a roller conveyor, comprising:
    a roller defining and being selectively rotatable about a rotation axis, said roller being suspended at opposing ends by a first support and a second support;
    a locking mechanism including a lock shaft and a lock clutch,
        said lock shaft defining a lock shaft axis that extends parallel to said rotation axis, said lock shaft including a first end portion that is mounted to said first support, said lock shaft being in substantially fixed relationship relative to said first support;
        said lock clutch being coupled to and in fixed rotational relationship with said roller, said lock clutch being translatable along said lock shaft from a lock position to an unlock position; and
    an actuation mechanism configured to translate said roller and said lock clutch from said lock position to said unlock position,
    wherein:
        when said actuation mechanism is in said lock position, said lock shaft is coupled with said lock clutch, thereby preventing said roller from rotating about said rotation axis, and
        when said actuation mechanism is in said unlock position, said lock shaft is decoupled from said lock clutch, thereby enabling said roller to rotate about said rotation axis.

8. The locking roller assembly of claim 7, wherein:
said actuation mechanism includes a cam and a lever, said cam being configured to translate said roller and said lock clutch from said lock position to said unlock position, and said lever being affixed to said cam, said lever and said cam being rotatable about a pivot axis to actuate said cam, said pivot axis extending in a direction that is orthogonal to said shaft axis; and
    when said actuation mechanism is rotated from said lock position to said unlock position, said cam translates said lock clutch along said lock shaft to decouple said lock clutch from said lock shaft, thereby enabling said roller to rotate about said rotation axis.

9. The locking roller assembly of claim 8, wherein said lever includes an arcuate portion that, when in a lock position, extends through a plane that is inclusive of an upper-most tangent line of said roller, said plane being parallel to said pivot axis.

10. The locking roller assembly of claim 9, wherein, when in an unlock position, said arcuate portion of said lever is below and substantially flush with said plane.

11. The locking roller assembly of claim 7, wherein:
said lock clutch includes a plurality of fingers that define a plurality of notches therebetween;
said locking mechanism includes at least one protrusion that extends within said plurality of notches to engage said plurality of fingers when said lever and a cam are in said lock position, thereby preventing said roller from rotating about said rotation axis; and
said lock clutch translates parallel to said lock shaft axis to pass over and disengage said at least one protrusion when said actuation mechanism is in said unlock position, thereby enabling said roller to rotate about said rotation axis.

12. The locking roller assembly of claim 11, wherein said at least one protrusion extends radially outward relative to said lock shaft axis for engagement with said plurality of fingers.

13. The locking roller assembly of claim 12, wherein said plurality of fingers extend radially inward, toward said lock shaft axis.

14. The locking roller assembly of claim 13, wherein said plurality of fingers extend radially inward from a continuous outer ring portion of said lock clutch.

15. The locking roller assembly of claim 7, wherein said locking mechanism include a biasing element coupled to said lock shaft that biases said locking mechanism and said actuation mechanism toward said lock position.

16. The locking roller assembly of claim 15, wherein said biasing element is one of a spring and a repelling magnetic arrangement.

17. The locking roller assembly of claim 16, wherein said spring is one of a coil spring, a bow spring, and an elastic plug.

18. The locking roller assembly of claim 17, wherein:
said locking mechanism includes a pin that extends radially outward relative to said lock shaft axis; and
said biasing element is said coil spring that acts against said pin to bias said locking mechanism toward said lock position.

19. The locking roller assembly of claim 18, wherein said coil spring is coaxial about said lock shaft axis.

* * * * *

UNITED STATES PATENT AND TRADEMARK OFFICE
CERTIFICATE OF CORRECTION

PATENT NO. : 10,507,977 B2  
APPLICATION NO. : 16/061976  
DATED : December 17, 2019  
INVENTOR(S) : Baer Page 1 of 1

It is certified that error appears in the above-identified patent and that said Letters Patent is hereby corrected as shown below:

In the Claims

In Column 14, Claim 5, Line 20, delete "earn" and insert -- cam --, therefor.

Signed and Sealed this  
Fourth Day of February, 2020

Andrei Iancu  
*Director of the United States Patent and Trademark Office*